United States Patent
Bodas et al.

(10) Patent No.: US 9,063,785 B2
(45) Date of Patent: Jun. 23, 2015

(54) TEMPERATURE-BASED THREAD SCHEDULING

(75) Inventors: Devadatta V. Bodas, Federal Way, WA (US); Jun Nakajima, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 1584 days.

(21) Appl. No.: 11/096,976

(22) Filed: Mar. 31, 2005

(65) Prior Publication Data

US 2006/0095913 A1 May 4, 2006

Related U.S. Application Data

(63) Continuation-in-part of application No. 10/982,613, filed on Nov. 3, 2004.

(51) Int. Cl.
*G06F 9/46* (2006.01)
*G06F 1/00* (2006.01)
*G06F 9/50* (2006.01)

(52) U.S. Cl.
CPC ............ *G06F 9/5027* (2013.01); *G06F 9/5094* (2013.01); *Y02B 60/142* (2013.01)

(58) Field of Classification Search
USPC .............. 718/1, 100, 103, 104, 105; 713/340, 713/320, 1; 702/188
See application file for complete search history.

(56) References Cited

U.S. PATENT DOCUMENTS

| | | | | |
|---|---|---|---|---|
| 5,974,438 A * | 10/1999 | Neufeld | ......................... | 718/104 |
| 6,091,255 A * | 7/2000 | Godfrey | ......................... | 324/760 |
| 6,340,874 B1 * | 1/2002 | Vladimir | ........................ | 318/471 |
| 6,643,128 B2 * | 11/2003 | Chu et al. | .................. | 361/679.48 |
| 6,795,781 B2 | 9/2004 | Aldridge et al. | | |
| 6,829,713 B2 | 12/2004 | Cooper et al. | | |
| 6,909,922 B2 * | 6/2005 | Tymchenko | ..................... | 700/21 |
| 6,925,573 B2 | 8/2005 | Bodas | | |
| 7,174,194 B2 * | 2/2007 | Chauvel et al. | ................ | 455/574 |
| 7,197,652 B2 * | 3/2007 | Keller et al. | ................... | 713/320 |
| 7,216,223 B2 | 5/2007 | Michaelis | | |
| 7,318,128 B1 * | 1/2008 | Dice | ............................. | 711/151 |
| 7,343,505 B2 * | 3/2008 | Chotoku et al. | .............. | 713/340 |
| 7,620,827 B2 * | 11/2009 | Muraki | .......................... | 713/300 |
| 2002/0065049 A1 | 5/2002 | Chauvel et al. | | |
| 2002/0101715 A1* | 8/2002 | Osecky et al. | ................ | 361/687 |
| 2003/0095381 A1* | 5/2003 | Lee et al. | ........................ | 361/687 |
| 2003/0110012 A1* | 6/2003 | Orenstien et al. | ............. | 702/188 |
| 2003/0229662 A1* | 12/2003 | Luick | ............................. | 709/106 |
| 2004/0139138 A1 | 7/2004 | Chen et al. | | |
| 2004/0163001 A1 | 8/2004 | Bodas | | |

(Continued)

OTHER PUBLICATIONS

U.S. Appl. No. 10/982,613; Title: Power Consumpton-Based Thread Scheduling; Inventor: Devadatta V. Bodas et al.; filed Nov. 3, 2004.

(Continued)

*Primary Examiner* — Tammy Lee
(74) *Attorney, Agent, or Firm* — Trop, Pruner & Hu, P.C.

(57) ABSTRACT

Systems and methods of managing software threads provide for selecting a software thread for execution by a processing architecture having a plurality of processing cores and a cooling module. A target core is selected from the plurality of cores based on the effectiveness of the cooling module with regard to each of the plurality of cores, and the selected thread is scheduled for execution by the target core.

22 Claims, 8 Drawing Sheets

(56) References Cited

U.S. PATENT DOCUMENTS

| | | | |
|---|---|---|---|
| 2005/0055590 A1* | 3/2005 | Farkas et al. | 713/320 |
| 2005/0097554 A1* | 5/2005 | Burden | 718/100 |
| 2005/0138438 A1 | 6/2005 | Bodas | |
| 2005/0216775 A1* | 9/2005 | Inoue | 713/300 |
| 2005/0278520 A1* | 12/2005 | Hirai et al. | 713/1 |
| 2006/0005097 A1* | 1/2006 | Ichikawa et al. | 714/745 |
| 2006/0037024 A1 | 2/2006 | Bodas | |
| 2006/0047808 A1* | 3/2006 | Sharma et al. | 709/224 |
| 2006/0090161 A1 | 4/2006 | Bodas et al. | |

OTHER PUBLICATIONS

U.S. Appl. No. 11/393,393; Title: Performance State Management; Inventor: Devadatta V. Bodas; filed Mar. 30, 2006.

* cited by examiner

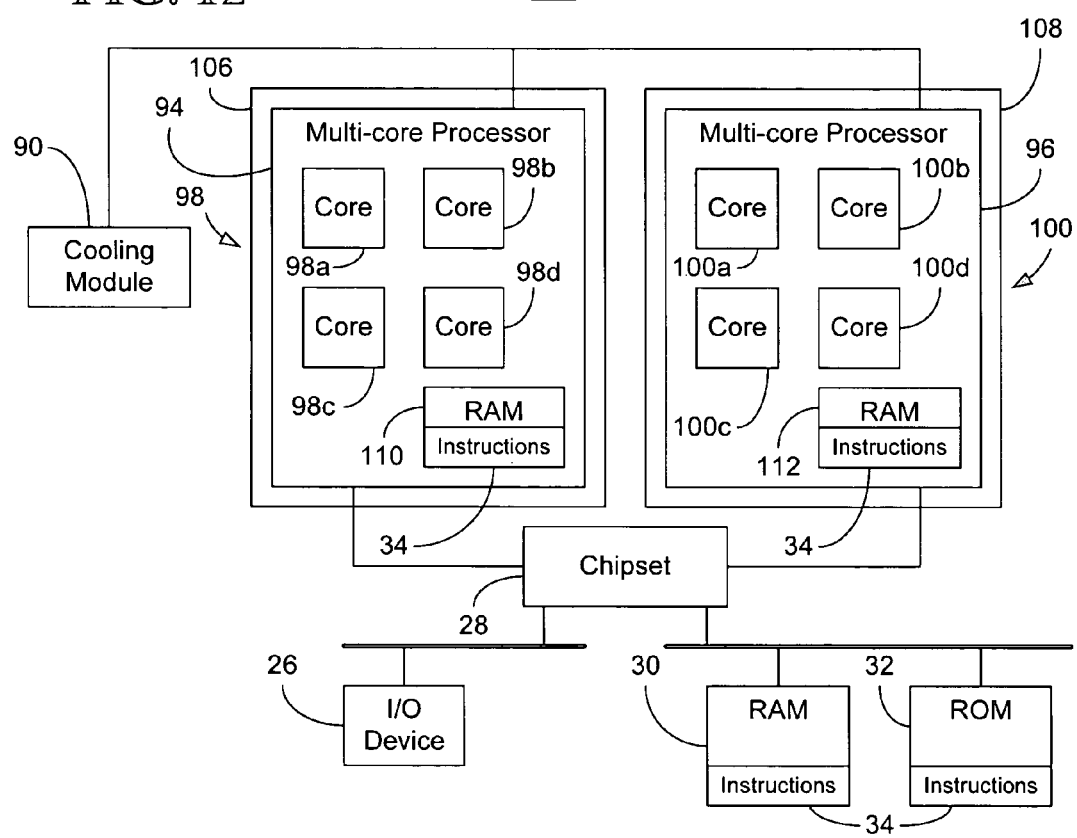

US 9,063,785 B2

TEMPERATURE-BASED THREAD SCHEDULING

CROSS-REFERENCE TO RELATED APPLICATIONS

The present application is a continuation-in-part application of U.S. patent application Ser. No. 10/982,613, filed on Nov. 3, 2004.

BACKGROUND

1. Technical Field

One or more embodiments of the present invention generally relate to thread management. More particularly, certain embodiments relate to thread scheduling based on temperature data.

2. Discussion

As the trend toward advanced central processing units (CPUs) with more transistors and higher frequencies continues to grow, computer designers and manufacturers are often faced with corresponding increases in power consumption as well as denser concentrations of power. If power is too densely concentrated on a die, a "hot spot" can occur, making cooling more challenging and more expensive. As die sizes shrink, these difficulties increase in magnitude.

BRIEF DESCRIPTION OF THE DRAWINGS

The various advantages of the embodiments of the present invention will become apparent to one skilled in the art by reading the following specification and appended claims, and by referencing the following drawings, in which:

FIG. 12 is a diagram of an example of a system according to one embodiment of the invention.

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Figure 1:
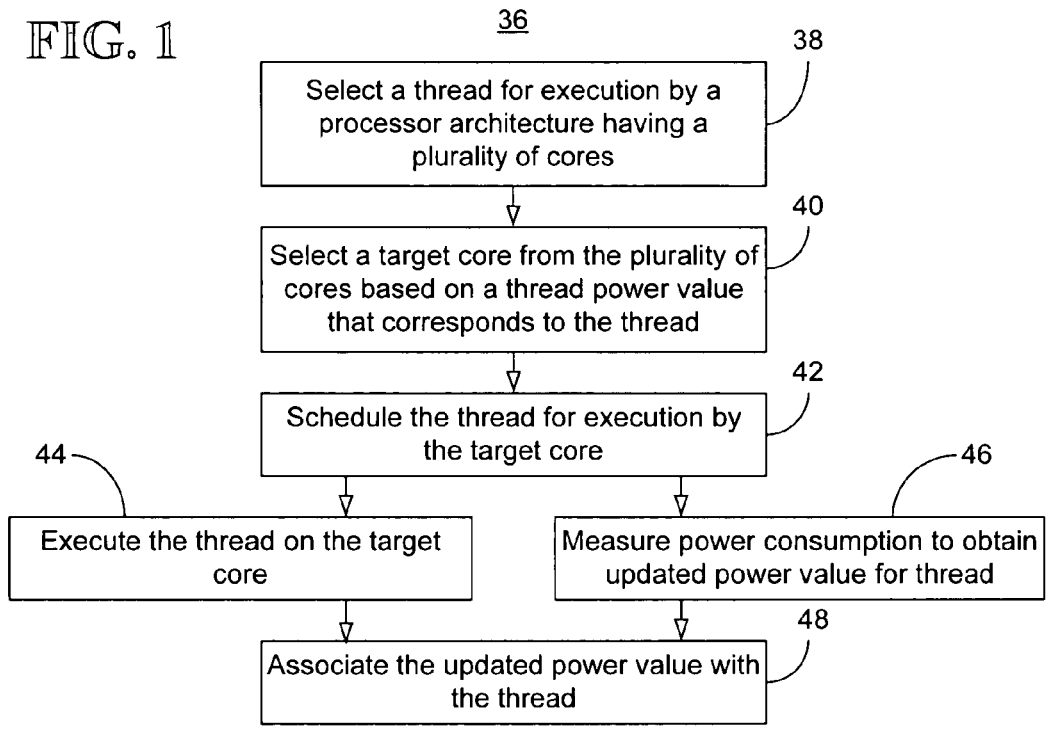
FIG. 1 is a flowchart of an example of a method of managing threads according to one embodiment of the invention.

FIG. 1 shows a method 36 of managing threads that represents a substantial improvement over conventional approaches. The method 36 can be implemented in fixed functionality hardware such as complementary metal oxide semiconductor (CMOS) technology, microcode, software, or any combination thereof. In one embodiment, the method 36 is partially implemented as hardware in a processor core and partially as a set of instructions in an operating system (OS). For example, processing blocks 38, 40 and 42 may be implemented as a set of instructions stored in a machine readable medium, whereas processing blocks 44, 46 and 48 may be implemented as fixed functionality hardware. In the illustrated example, a thread is selected for execution at processing block 38, where the thread is to be executed by a processing architecture having a plurality of cores. Block 40 provides for selecting a target core from the plurality of cores based on a thread power value that corresponds to the selected thread. The thread power value, which can be either measured or estimated, may represent the power consumption associated with the thread in question. The thread is scheduled for execution by the target core at block 42.

It should be noted that traditional schedulers do not take power into consideration when selecting a target core. By selecting the target core based a thread power value, the illustrated method 36 enables the processing architecture to distinguish between threads that consume a relatively large amount of power and threads that do not. As result, more intelligent decisions can be made when scheduling threads. For example, the knowledge of thread power values can provide for the distribution of a workload across multiple cores in an effort to reduce thermal density.

Block 44 provides for executing the thread on the target core and block 46 provides for measuring the power consumption of the target core during the execution to obtain an updated power value for the thread. The measurement at block 46 need not be conducted each time a thread is run, although in systems having a great deal of leakage current variability due to environmental factors, for example, such an approach may be desirable. In addition, the measurement time period need not be the entire amount of time required to execute the thread, so long as the period is consistent from thread-to-thread. In fact, the time period can be fully configurable depending upon the circumstances. The updated power value is associated with the thread at block 48, where the associating can include storing the updated power value to a memory location, as described in greater detail below.

Figure 2:
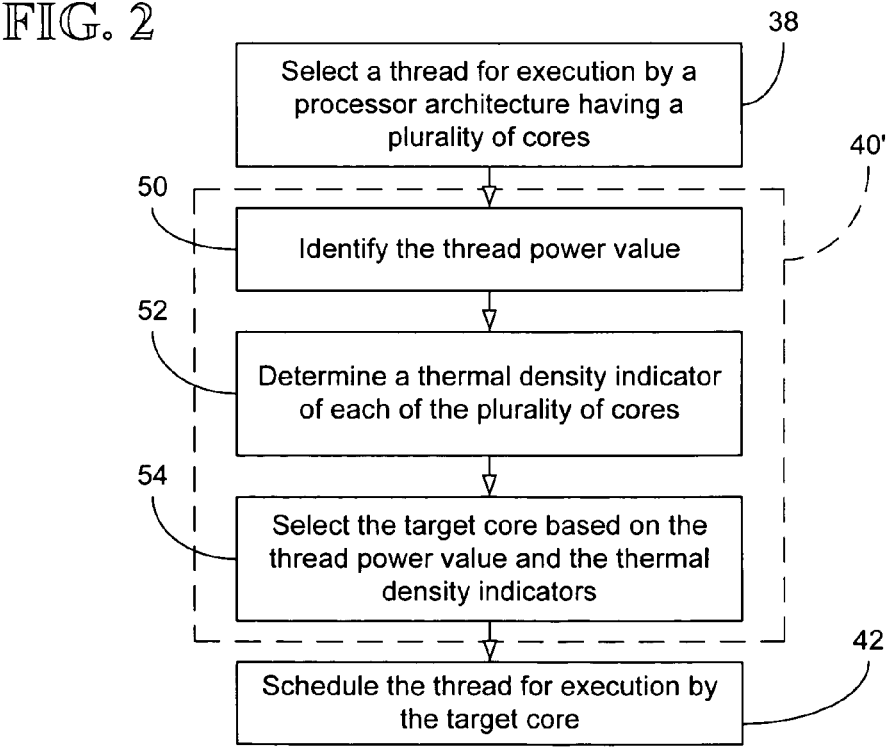
FIG. 2 is a flowchart of an example of a process of selecting a target core according to one embodiment of the invention.

Turning now to FIG. 2, one approach to selecting the target core is shown in greater detail at block 40'. In particular the illustrated block 50 provides for identifying the thread power value and block 52 provides for determining a thermal density indicator of each of the plurality of cores. The thermal density indicators provide additional information about the status of the system. For example, the thermal density indicators could indicate that certain processor cores are contributing to the overall thermal density more so than others. The thread power value and the thermal density indicators can be used in block 54 to select the target core. Thus, if it is determined at block 54 that the selected thread is associated with a high power consumption, a core having a low thermal density indicator can be selected as the target core in order to reduce the thermal density of the overall processing architecture. The use of thread power values along with thermal density indicators can therefore lead to further power and/or thermal savings.

Figure 3:
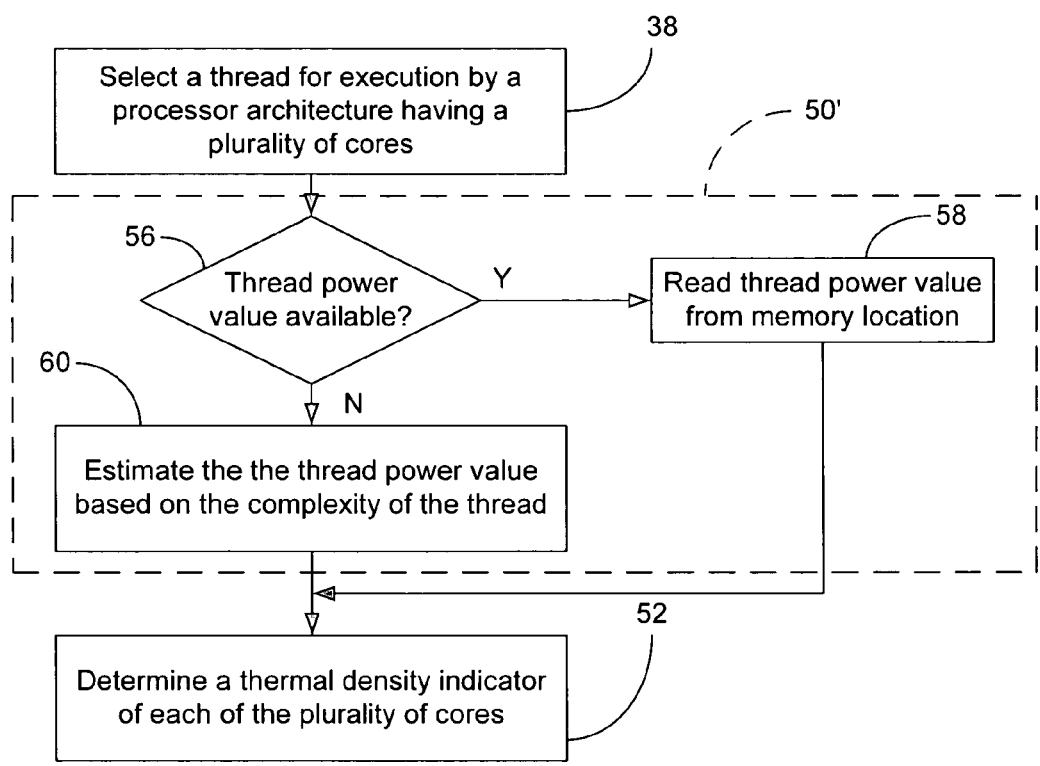
FIG. 3 is a flowchart of an example of a process of identifying a thread power value according to one embodiment of the invention.

FIG. 3 shows one approach to identifying a thread power value in greater detail at block 50'. In particular, block 56 provides for determining whether the thread power value is available. If the thread power value is available, the thread power value is read from a memory location at block 58 in the illustrated example. Otherwise, block 60 provides for estimating the thread power value based on the complexity of the thread. The thread complexity could be provided by a software developer or compiler of the program with which the thread is associated. Thus, more complex code may translate into a higher thread power value and vice versa.

Figure 4A:
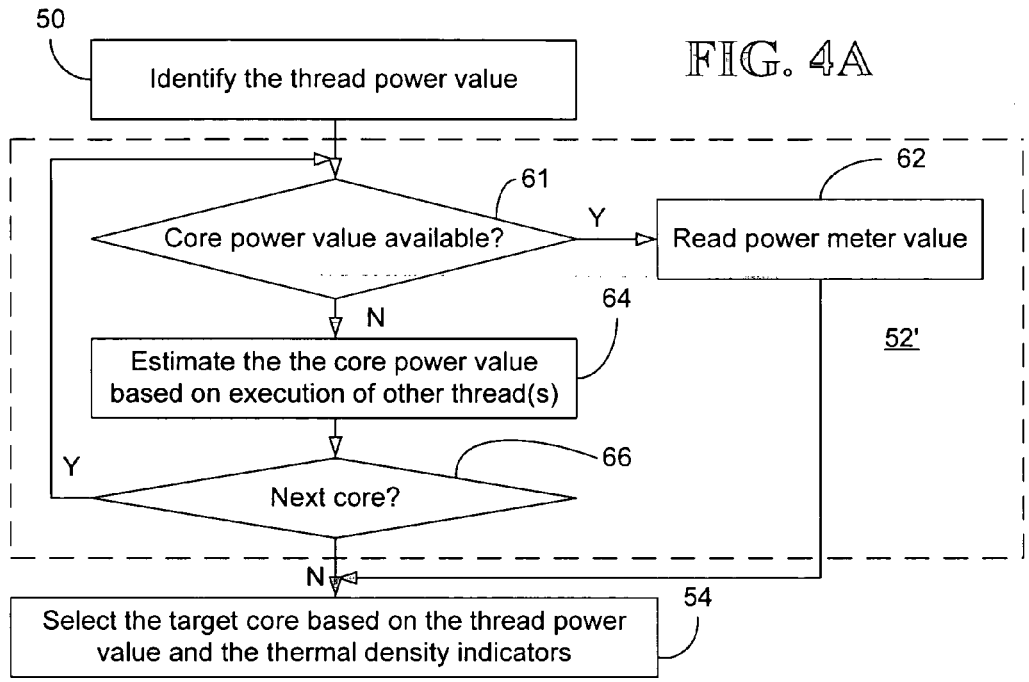
FIG. 4A is a flowchart of an example of a process of determining a plurality of thermal density indicators according to one embodiment of the invention.

Turning now to FIG. 4A, one approach to determining a thermal density indicator for each of the plurality of cores is shown in greater detail at block 52'. In the illustrated example, it is determined whether a core power value is available from a power meter coupled to the core in question at block 61. If so, a power meter value is read at block 62. Otherwise, block 64 provides for estimating the core power value based on one or more threads previously executed on the core. One may estimate core power by summing the thread power values for the threads run on the core in a given time quantum. Thus, if threads with high power values (or high complexity) were executed on the core, a high core power value may be estimated as a result of the summation. On the other hand, if threads with low power values (or low complexity) were executed on the core, a low core power value may be estimated as a result of the summation. Block 66 provides for selecting the next core in the plurality of cores.

Figure 4B:
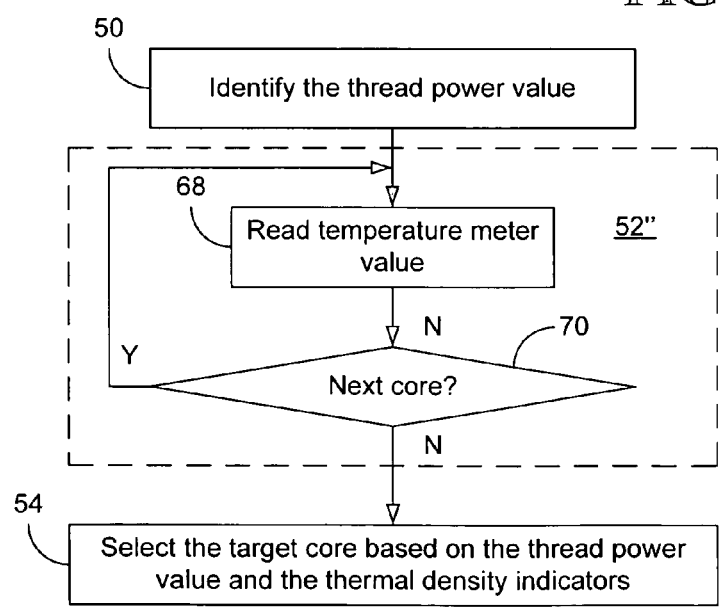
FIG. 4B is a flowchart of an example of a process of determining a plurality of thermal density indicators according to an alternative embodiment of the invention.

FIG. 4B demonstrates an alternative approach to determining thermal density indicators at block 52". In this example, core temperature is used as a thermal density indicator. Block 68 provides for reading a temperature meter value and block 70 provides for selecting the next core in the plurality of cores.

Figure 5:
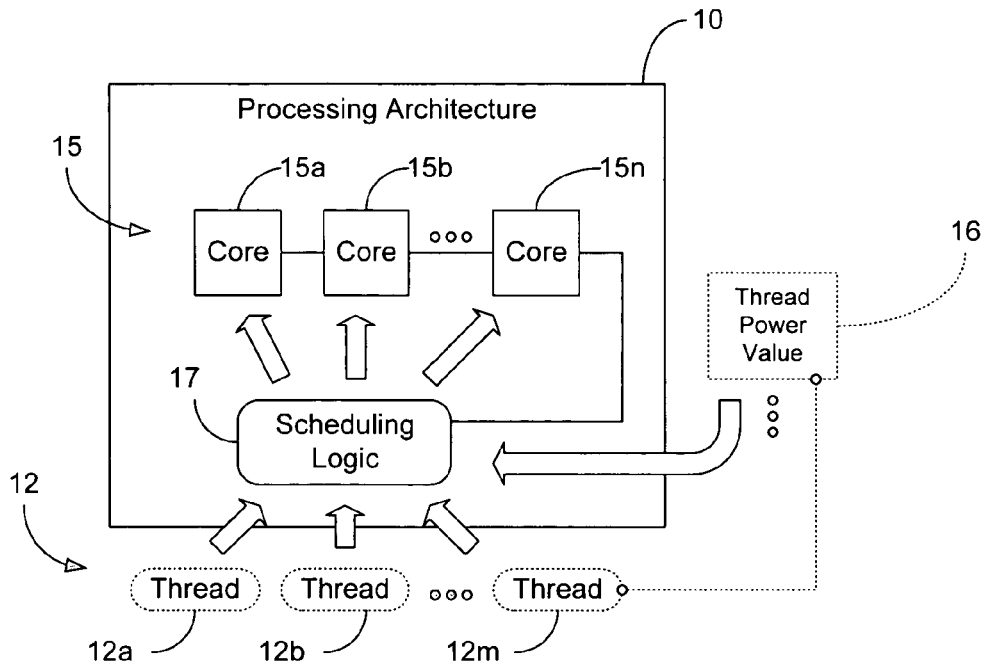
FIG. 5 is a block diagram of an example of a processing architecture according to one embodiment of the invention.

FIG. 5 shows a processing architecture 10 capable of executing one or more threads 12 (12a-12m), where the threads 12 represent a workload for the processing architecture 10. The illustrated architecture 10 includes a plurality of processor cores 15 (15a-15n), which can be similar to a Pentium® 4 processor core available from Intel® Corporation in Santa Clara, Calif. Each core 15 may therefore be fully functional with instruction fetch units, instruction decoders, level one (L1) cache, execution units, and so on (not shown). The processing architecture 10 could include a plurality of processor chips, where each chip includes a subset of the plurality of cores 15.

Each thread 12 may be any part of a program, process, instruction set or application that can be run independently of other aspects of the program, process, instruction set or application. The illustrated architecture 10 also includes scheduling logic 17 that is able to select a thread 12 for execution by the processing architecture 10. The scheduling logic 17 may be implemented in fixed functionality hardware, microcode, in software such as an operating system (OS), or any combination thereof. The selection of a thread 12 can be based on a wide variety of factors such as priority, dependency of one thread 12 over another, availability of resources, locality of instructions and data, etc.

The scheduling logic 17 is also able to select a target core from the plurality of cores 15 based on a thread power value that corresponds to the selected thread. In the illustrated example, the thread power value 16 corresponds to the thread 12m. The thread power value 16, which can be either measured or estimated, may represent the power consumption associated with the thread in question, namely, thread 12m. Once the target core is selected, the illustrated scheduling logic 17 schedules the selected thread for execution by the target core. By selecting the target core based on the thread power value 16, the illustrated processing architecture 10 is able to provide a number of advantages over conventional architectures. For example, scheduling decisions can be made based on the per-thread power consumption, which may lead to lower temperatures, simplified cooling schemes and/or greater power savings. In particular, it may be desirable to distribute the threads 12 across multiple cores in order to reduce the thermal density of the processing architecture 10.

Figure 6:
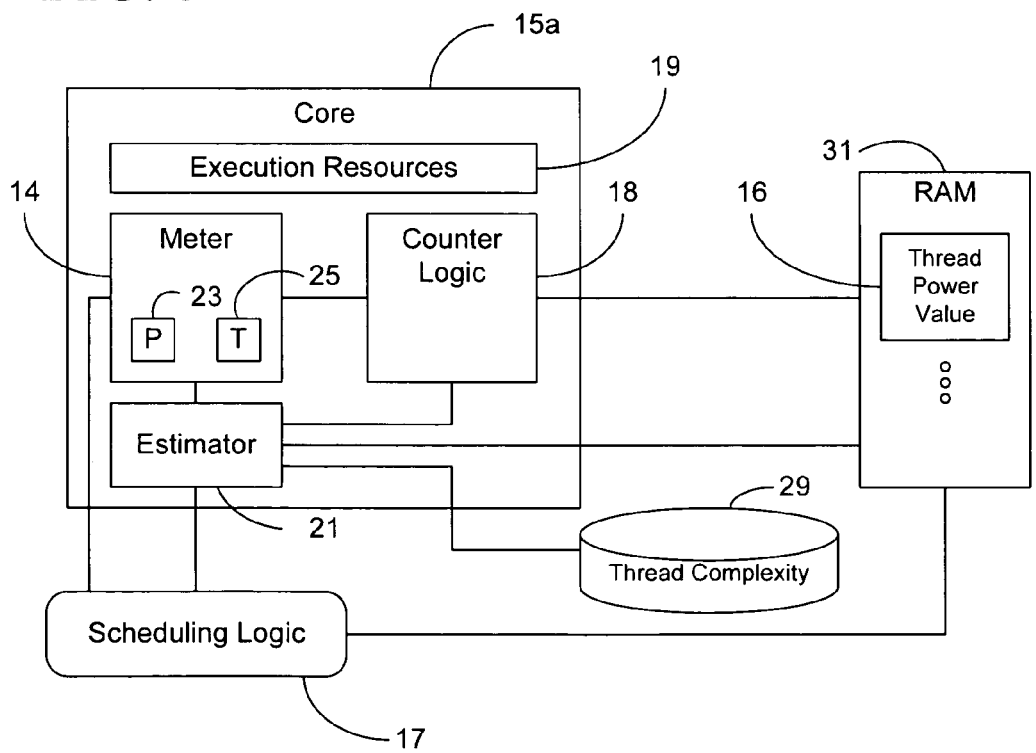
FIG. 6 is a diagram of an example of a processor core according to one embodiment of the invention.

Turning now to FIG. 6, one example of the use of thread power values and thermal density indicators is shown in greater detail. In particular, in the illustrated example, the processor core 15a includes execution resources 19 such as instruction fetch units, instruction decoders, L1 cache, execution units, etc., a meter 14, an estimator 21 and counter logic 18. The execution resources 19 can be used to run the scheduling logic 17 and execute threads, where the meter 14 is able to use a power component 23 to measure the power consumption of the core 15a and use a temperature component 25 to measure the temperature of the core 15a. The illustrated counter logic 18 can associate the thread power value 16 with the thread 12m (FIG. 1) by storing the thread power value 16 to a memory location such as a memory location in a random access memory (RAM) 31 or other memory structure. The thread power value 16 could be stored as part of other relevant thread information such as priority, dependency (e.g., parent and child thread identifiers), etc.

If the selected thread is new to the system, or otherwise does not have a thread power value associated with it, the illustrated estimator 21 may estimate the thread power value based on complexity data stored in a thread complexity database 29. The information in the thread complexity database 29 could be provided by a software developer or as part of a tool such as a compiler. The estimator 21 may also estimate core power values based on one or more threads that have previously been executed on the core 15a. For such an estimation, the estimator 21 might need access to the RAM 31. Thus, illustrated the scheduling logic 17 may identify the thread power value by either reading the thread power value from a memory location in the RAM 31 or retrieving an estimated thread power value from the estimator 21. The illustrated scheduling logic 17 can also determine a thermal density indicator of the core 15a by reading either a core power value or a core temperature value from the meter 14, or by retrieving an estimated core power value from the estimator 21. Once a thermal density indicator has been retrieved from each of the plurality of cores, the illustrated scheduling logic 17 can then select a target core based on the thread power value and the thermal density indicators.

Figure 7A:
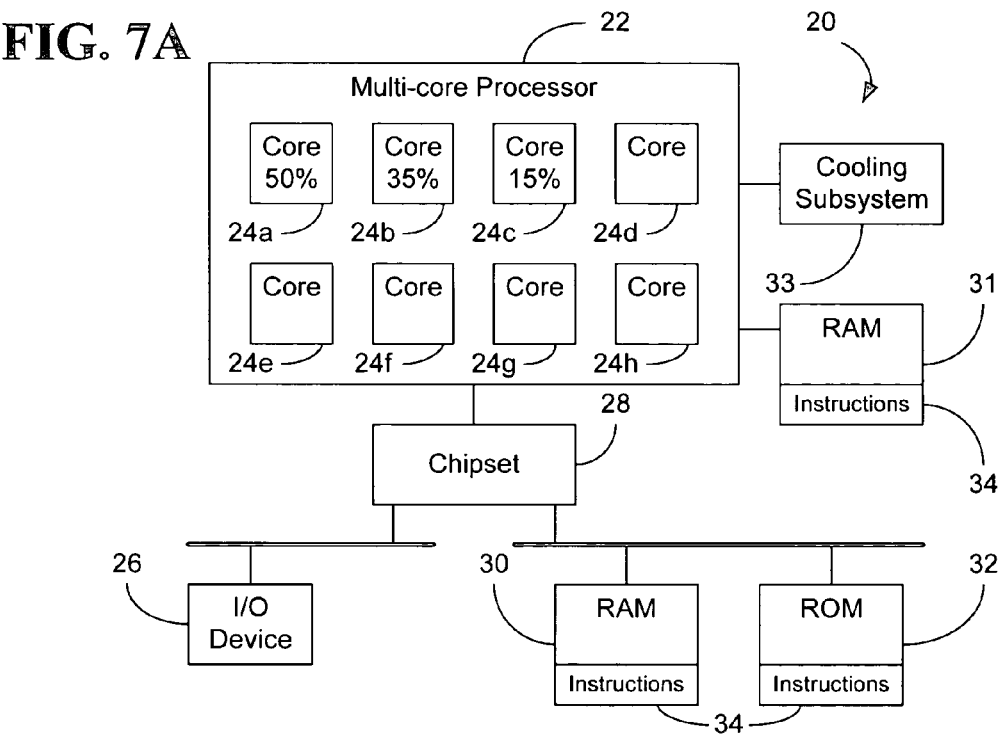
FIG. 7A is a diagram of an example of a processing system with a distributed workload according to one embodiment of the invention.

Turning now to FIG. 7A, a system 20 is shown in which a multi-core processor 22 has a plurality of cores 24 (24a-24h). Although the processor 22 is shown as having eight cores, the number of cores in the processor may be greater or fewer than the number shown. Furthermore, all of the cores need not be located on the same processor chip. Thus, the techniques described herein can be readily applied to single- or multi-socket computing systems that use multi-core processors, or multi-socket computing systems that use single core processors. In this regard, although some examples are described with regard to multi-core processors, the embodiments of the invention are not so limited. Indeed, any processing architecture in which power consumption is an issue of concern can benefit from the principles described herein. Notwithstanding, there are a number of aspects of multi-core processors for which the embodiments of the invention are well suited.

The system 20 may be part of a server, desktop personal computer (PC), notebook PC, handheld computing device, and so on. Each of the cores 24 may be similar to the cores 15 (FIGS. 5 & 6) discussed above, and may include a power meter and counter logic as already described. Alternatively, the power meter and control logic can be located elsewhere in the processor 22 and/or system 20. The processor 22 is coupled to one or more input/output (I/O) devices 26 and various memory subsystems either directly or by way of a chipset 28, where the thread power values (not shown) may be stored on any of the memory subsystems. In the illustrated example, the memory subsystems include a random access memory (RAM) 30 and 31 such as a fast page mode (FPM), error correcting code (ECC), extended data output (EDO) or synchronous dynamic RAM (SDRAM) type of memory, and may also be incorporated in to a single inline memory module (SIMM), dual inline memory module (DIMM), small outline DIMM (SODIMM), and so on. The memory subsystems may also include a read only memory (ROM) 32 such as a compact disk ROM (CD-ROM), magnetic disk, etc. The illustrated RAM 30, 31 and ROM 32 include instructions 34 that may be executed by the processor 22 as one or more threads.

In the illustrated example, a workload is distributed across three of the processor cores, namely, core 24a, core 24b and core 24c. As a result, processor 24a is 50% utilized, processor 24b is 35% utilized and processor 24c is 15% utilized. The workload distribution can be achieved by selectively allocating individual threads to the various processor cores. The decision to distribute the workload across the cores 24a-24c can be made based on the thread power value (e.g., power consumption) that is associated with each thread. A workload may therefore include one or more threads, where the threads may be assigned to one core or may distributed to multiple cores. For example, if a given thread is known to have a relatively high power consumption, it can be assigned to a core in such a fashion as to reduce the thermal density of the processor package. In this regard, it should be noted that conventional scheduling techniques do not take power consumption into consideration and would therefore most likely simply assign a given thread to either the core that last ran the thread or the first available core. The result could be a substantially greater risk of overheating and the need for more a costly cooling solution due to a greater power density.

For example, the system 20 could also include a cooling subsystem 33 that is coupled to the processor 22. The cooling subsystem 33 might include a forced airflow mechanism such as a fan that blows air over the processor 22 to reduce the temperature of the processor 22. In one embodiment, the cooling subsystem 33 can reduce airflow to the processor 22 by lowering the fan speed based on the reduced thermal density resulting from the techniques described herein. The reduced fan speed may lead to less power consumption, less noise and greater cost savings for the cooling subsystem 33.

Figure 7B:
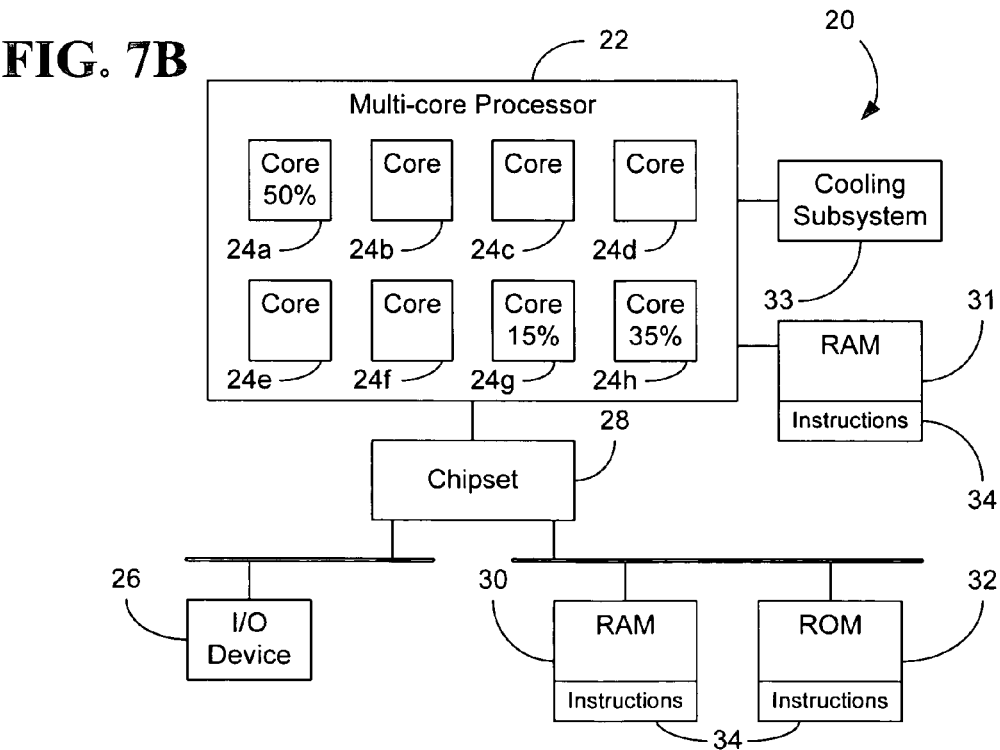
FIG. 7B is a diagram of an example of a processing system with a distributed workload according to an alternative embodiment of the invention.

FIG. 7B shows an alternative approach to distributing a thread in which the thermal density of the package is less than in the example given above. In particular, the workload is distributed so that processor 24h is 35% utilized, where core 24h is much farther away from core 24a than core 24b. In addition, core 24g is 15% utilized, where core 24g is also relatively far away from core 24a. By further decreasing the thermal density of the processor package, it is much easier to cool the processor 22. Simpler cooling techniques can lead to reduced cost, size and complexity of the overall system 20.

Thus, making use of power consumption data as described can enable better distribution of thermal loads and can lead to a significant reduction in junction temperature without compromising performance. Lowering the junction temperature can also lead to lower leakage power, which is paramount as processors continue to shrink. Lower temperatures can also provide for better reliability and lower acoustics due to more passive cooling techniques (e.g., slower fan speeds).

Further Embodiments

Figure 8:
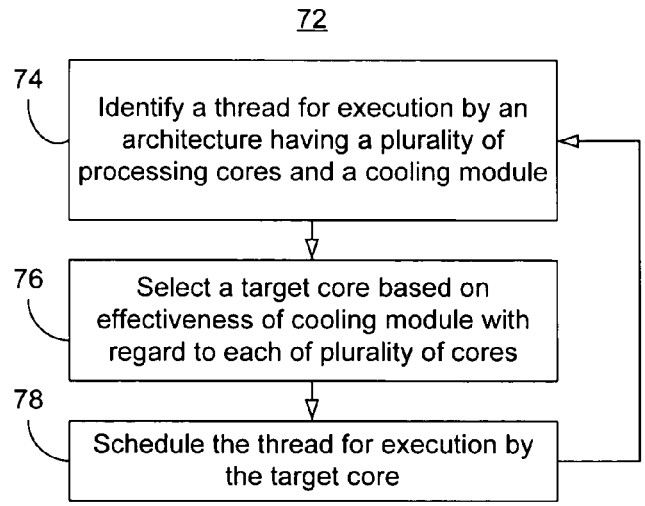
FIG. 8 is a flowchart of an example of a method of managing threads according to one embodiment of the invention.

Turning now to FIG. 8, an alternative approach to managing threads is shown in method 72, where cooling effectiveness is used to select target cores rather than thread power values. The method 72 can be implemented in fixed functionality hardware such as CMOS technology, microcode, software, or any combination thereof. In particular, the illustrated block 74 provides for identifying a thread for execution by an architecture having a plurality of processing cores and a cooling module. The plurality of processing cores and the cooling module could be similar to the cores and cooling subsystem already discussed. A target core is selected from the plurality of processing cores at block 76 based on the effectiveness of the cooling module with regard to each of the plurality of processing cores. For example, the cooling module could be a forced air type of mechanism in which some cores are positioned in closer proximity to the cooling module than other cores. In such a situation, the cores in close proximity may be cooled more effectively than the cores in relatively distant proximity, where the cores in close proximity might be better candidates for the target core. It should be noted that traditional schedulers do not take cooling effectiveness into consideration when selecting a target core. Block 78 provides for scheduling the thread for execution by the target core. In the illustrated example, the identifying, selecting and scheduling can be repeated for multiple threads.

Figure 9A:
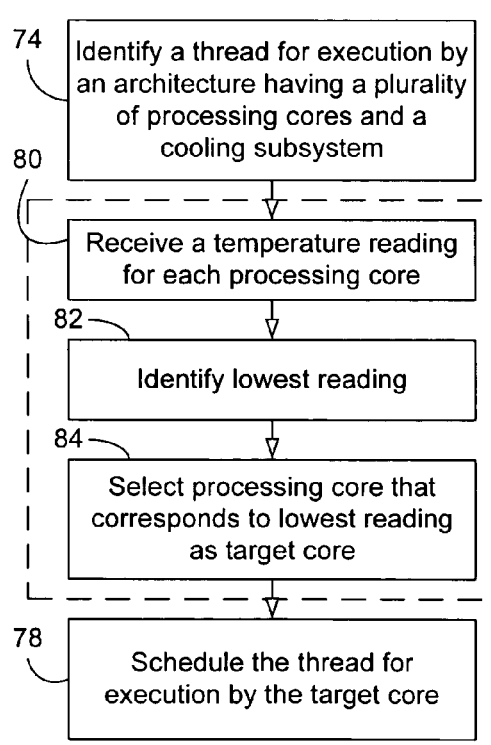
FIG. 9A is a flowchart of an example of a process of selecting a target core according to one embodiment of the invention.

FIG. 9A shows one approach to selecting target cores in greater detail at block 76'. In particular, the illustrated block 80 provides for receiving a temperature reading for each of the plurality of processing cores to obtain a corresponding plurality of temperature readings. Each temperature reading could be a digital or analog signal. Furthermore, each temperature reading could be generated by an internal temperature sensor such as a thermal diode/meter located near a hot spot of a corresponding core, or generated by an external temperature sensing device. The lowest reading in the plurality of temperature readings can be identified at block 82, where illustrated block 84 provides for selecting the processing core that corresponds to the lowest reading as the target core. Thus, one way to determine the effectiveness of the cooling module with regard to each of the plurality of cores is to measure the temperature of each core. Alternatively, the temperature of each core could be calculated based on another parameter or characteristic such as power consumption. For example, a predefined thermal resistance could be used for each core, where the thermal resistance is defined by the ratio of change in temperature to change in power. If one data point is assumed (e.g., set point) on processor power and relative temperature, the core temperature can be calculated by measuring power consumption. By selecting the core that corresponds to the lowest temperature reading/calculation, the process 76' can provide a straightforward approach to scheduling that does not require significant cost or processing resources to implement.

Figure 9B:
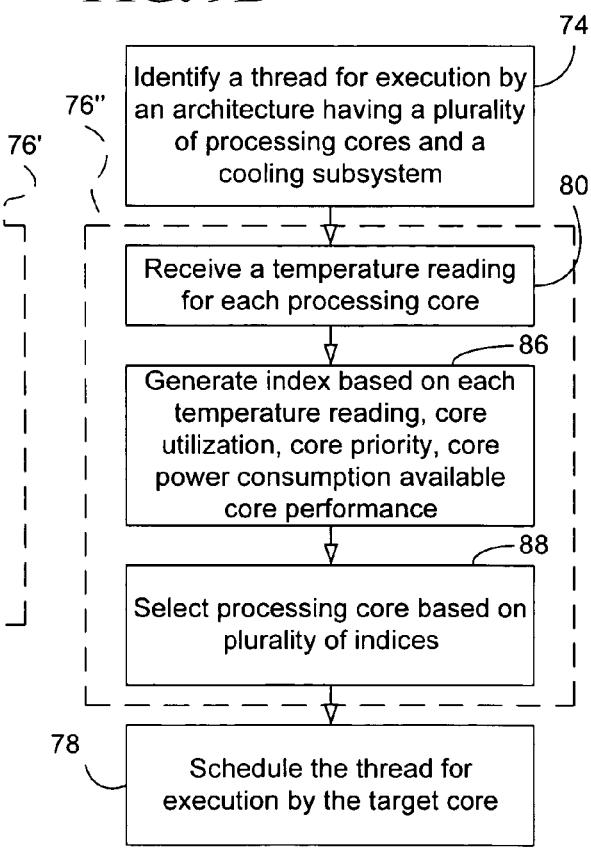
FIG. 9B is a flowchart of an example of a process of selecting a target core according to an alternative embodiment of the invention.

Turning now to FIG. 9B, another approach to selecting target cores is shown at block 76". In particular, the illustrated block 80 provides for receiving a temperature reading for each of the plurality of processing cores as already discussed. An index is generated at block 86 based on each of the plurality of temperature readings to obtain a plurality of indices. It can be seen that each index may also be generated based on a parameter such as core utilization, core power consumption, core priority and available core performance. For example, the index calculation could be a weighted sum represented by, $$C_i = w_1 f_1(t_i) + w_2 f_2(u_i) + w_3 f_3(pr_i) + w_4 f_4(P_i) + w_5 f_5(pe_i) \quad \text{Equation I}$$

Where $C_i$ is the cooling index for processing core i, t is the temperature reading, u is the core utilization, pr is the core priority, P is the core power consumption, pe is the available core performance, $f_1$ through $f_4$ are functions that can be complex in order to provide a nonlinear index (e.g., could use the square of utilization and the cube of temperature) and $w_1$ through $w_4$ are the relative weights. Block 88 provides for selecting the target core based on the plurality of indices. By selecting the target core based on a multi-parameter index, the process 76" provides a more robust solution with a relatively high level of accuracy.

Figure 10:
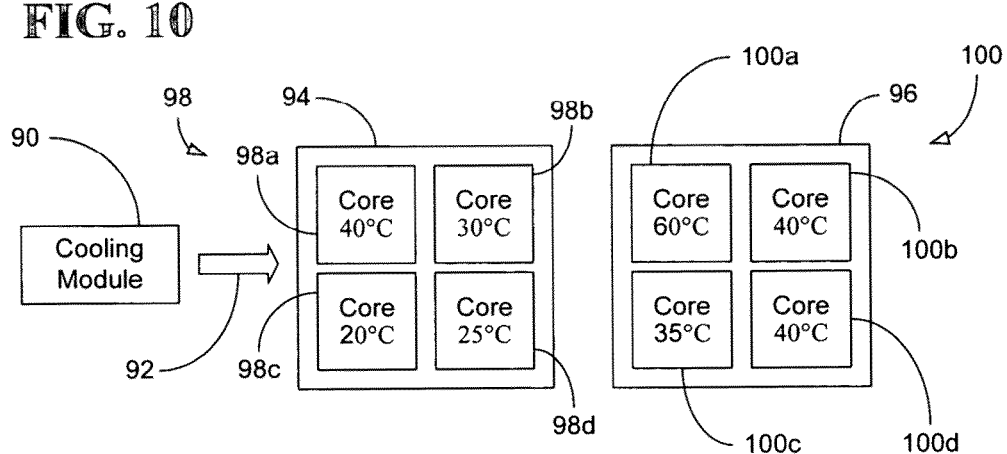
FIG. 10 is a block diagram of an example of a cooling scheme.

FIG. 10 shows a cooling scheme in which a cooling module 90 such as a fan-based cooling system is used. The illustrated cooling module 90 draws on air external to the system as a source and provides forced airflow 92 to a processing architecture having a first processor 94 and a second processor 96. The first processor 94 is shown as having a first plurality of cores 98 (98a-98d) and the second processor 96 is shown as having a second plurality of cores 100 (100a-100d). Although the processors 94, 96 are shown as each having four cores, the number of cores in the processors 94, 96 may be greater or fewer than the number shown. Furthermore, all of the cores 98, 100 need not be located on separate processor chips. Thus, the techniques described herein can be readily applied to single-or multi-socket computing systems that use multi-core processors or multi-socket computing systems that use single core processors. In this regard, although some examples are described with regard to multi-core processors, the embodiments of the invention are not so limited. Indeed, any processing architecture in which temperature and/or power consumption are issues of concern can benefit from the principles described herein. Notwithstanding, there are a number of aspects of multi-core processors for which the embodiments of the invention are well suited.

In the illustrated example, the first plurality of cores 98 is positioned in closer proximity to the cooling module 90 than the second plurality of cores 100. Thus, the first plurality of cores 98 is cooled with low temperature air, while the second plurality of cores 100 is cooled with preheated air from the first plurality of cores 98. As a result, the illustrated cores 98a, 98b, 98c and 98d could have temperatures of 40° C., 30° C., 20° C. and 25° C., respectively, whereas the illustrated cores 100a, 100b, 100c and 100d could have generally higher temperatures of 60° C., 40° C., 35° C. and 40° C., respectively.

If the system provides for thermal throttling, temperatures that exceed a given thermal threshold may trigger the throttling of various voltage, frequency and/or architectural components, and may therefore result in reduced performance. For example, if the thermal threshold is 50° C., throttling may be triggered for core 100a of the second processor 96 by way of an operating frequency/voltage reduction. Indeed, if the operating frequency/voltage is a shared resource, all of the cores 100 on the second processor 96 could undergo thermal throttling and experience reduced performance. Meanwhile, other cores such as core 98c of the first processor 94 may be benefiting from very effective cooling and could have the capacity to accept some or all of the threads scheduled for the core 100a. Although the above example describes the case in which one processor receives preheated air from another processor, similar concerns could arise in any multi-core architecture where all cores do not receive the same quality and quantity of cooling.

Figure 11:
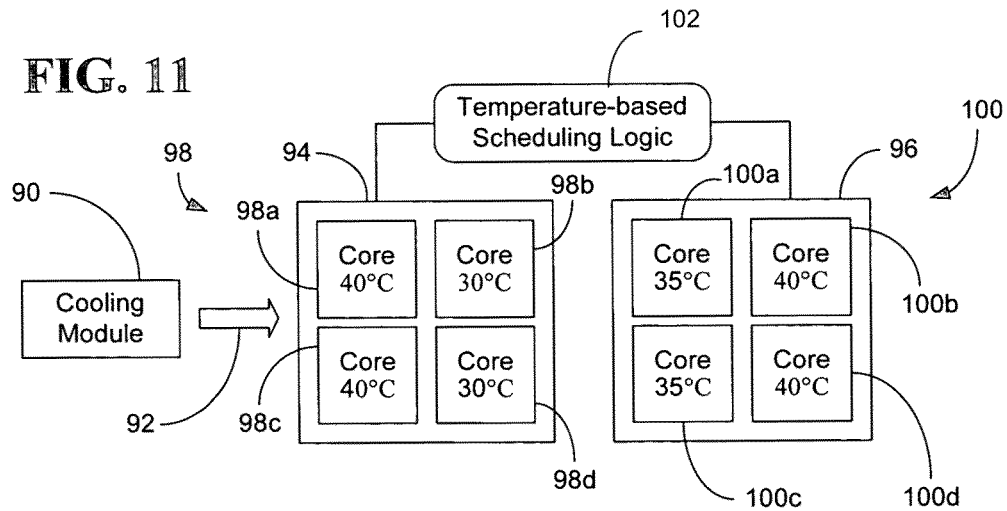
FIG. 11 is a block diagram of an example of a cooling scheme according to one embodiment of the invention.

Turning now to FIG. 11, it can be seen that temperature-based scheduling logic 102 can be used to improve the performance and reduce the temperature of the overall system. The scheduling logic 102 may be implemented in fixed functionality hardware, microcode, as software stored to a machine readable medium as a set of instructions, or any combination thereof. In the illustrated example, the scheduling logic 102 is operable to identify a thread for execution, select a target core from the cores 98, 100 based on an effectiveness of the cooling module 90 with regard to each of the cores 98, 100, and schedule the thread for execution by the selected target core. Thus, the scheduling logic 102 might determine that core 98c of the first processor 94 is being most effectively cooled by the cooling module 90 and therefore select the core 98c as the target core for one or more threads. By scheduling threads for the core 98c rather than the core 100a of the second processor 96, the scheduling logic 102 enables the core 100a to avoid thermal throttling and therefore operate at a higher performance level for the threads scheduled for that core.

In one approach, the scheduling logic 102 is operable to receive a temperature reading for each of the first plurality of cores 98 and the second plurality of cores 100 to obtain a plurality of temperature readings. To this end, each of the cores 98, 100 may be equipped with a temperature diode/meter located near a hot spot of the corresponding core. Alternatively, each temperature reading could be generated by an external temperature sensing device. Each temperature reading could also be a digital or analog signal. By gathering the temperature readings from each core, the scheduling logic 102 is able to create a thermal map/table for all of the processing cores in the system. In one embodiment, the scheduling logic 102 is operable to identify the lowest reading in the plurality of temperature readings and select the core that corresponds to the lowest reading as the target core. In another embodiment, the scheduling logic 102 is operable to generate an index based on each of the plurality of temperature readings to obtain a plurality of indices. In such a case, the scheduling logic 102 may select the target core based on the plurality of indices. The indices may also be generated based on other parameters such as core utilization, core priority, power consumption by the core and available core performance.

FIG. 12 shows a system 104 that may be part of a server, desktop personal computer (PC), notebook PC, handheld computing device, and so on. The illustrated system 104 has a first socket 106 coupled to the first processor 94, where the first processor 94 has a first plurality of cores 98 as already discussed. A second socket 108 is coupled to the second processor 96, which has a second plurality of cores 100 as also described above. The sockets 106, 108 could have any pin/form factor configuration suitable to mate with the corresponding processors 94, 96. Alternatively, the processors 94, 96 could be hardwired directly to an adjacent circuit board. The cores 98, 100 can be similar to a Pentium® 4 processor core available from Intel® Corporation in Santa Clara, Calif., where each core 98, 100 may be fully functional with instruction fetch units, instruction decoders, level one (L1) cache, execution units, and so on (not shown).

The illustrated processors 94, 96 are coupled to one or more input/output (I/O) devices 26 and various memory subsystems either directly or by way of a chipset 28, where the scheduling logic may be stored on any of the memory subsystems as a set of executable instructions 34 such as operating system instructions. The instructions 34 may be executed by the processors 94, 96 as one or more threads. In the illustrated example, the memory subsystems include a RAM 30, 110 and 112 such as a fast page mode (FPM), error correcting code (ECC), extended data output (EDO) or synchronous dynamic RAM (SDRAM) type of memory. The RAM 110, 112 is illustrated as being internal to the processors 94, 96, respectively, where the RAM 30 is illustrated as being located elsewhere in the system, and may be incorporated in to a single inline memory module (SIMM), dual inline memory module (DIMM), small outline DIMM (SODIMM), and so on. The memory subsystems may also include a read only memory (ROM) 32 such as a compact disk ROM (CD-ROM), magnetic disk, etc.

The illustrated cooling module 90 is coupled to the processors 94, 96, and provides a cooling solution that may be more effective for some of the processing cores than others. Accordingly, the instructions 34 may implement scheduling logic that is able to select a target core based on the effectiveness of the cooling module 90 with regard to each of the cores 98, 100. In one embodiment, the cooling effectiveness is approximated by obtaining temperature readings for each of the cores 98, 100. The result is an intelligent approach that makes use of readily available information and provides the opportunity for greater performance and less overheating than achievable under conventional approaches.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system, comprising:
   a first processor associated with a first processor socket;
   a second processor associated with a second processor socket;
   a thread scheduler logic at least a portion of which is in hardware, the thread scheduler logic to assign at least a first thread for execution on the first processor based, at least in part, on an effectiveness of a cooling solution coupled to the first and second processors, the effectiveness with regard to the first and second processors and based, at least in part, on a temperature of the first and second processors, the one of the first and second processors in closer proximity to the cooling solution to be cooled more effectively, and wherein the thread scheduler logic is to assign the first thread further based on a cooling index for each of the first and second processors, wherein the cooling index is to be calculated according to a weighted sum of a thermal value and one or more non-thermal parameters for each of the first and second processors including a processor priority value and a processor performance value.

2. The system of claim 1, wherein the thread scheduler logic to:
   determine a power density of each of the first and second processors if the first thread is executed on each of the respective first and second processors; and
   assign the first thread to the first processor, at least in part, if a power density of the first processor was determined to be less than a power density of the second processor.

3. The system of claim 1, wherein the cooling solution comprises one or more fans, wherein the amount of power consumed by the one or more fans to sustain a required airflow comprises an amount of power fed to the one or more fans.

4. The system of claim 3, wherein the required airflow comprises an amount of airflow to keep a given processor's temperature below a temperature threshold.

5. The system of claim 1, wherein the first processor and the second processor are heterogeneous processors.

6. The system of claim 1, wherein the system comprises a portable computing device.

7. The system of claim 1, wherein the thread scheduler logic is to assign at least the first thread for execution on the first processor, to prevent thermal throttling of one or more other threads executed on the second processor.

8. The system of claim 1, wherein the thread scheduler logic is to assign at least the first thread for execution on the first processor, to enable the second processor to execute one or more other threads at a higher performance level.

9. The system of claim 1, further comprising a thread complexity database to store complexity data associated with the first thread, the complexity data to be provided by a compiler.

10. A processor, comprising:
    a plurality of processor cores including a first processor core and a second processor core; and
    a thread scheduler logic at least a portion of which is in hardware, the thread scheduler logic to assign at least a first thread for execution on the first processor core based, at least in part, on an effectiveness of a cooling solution coupled to the plurality of processor cores, the effectiveness with regard to the first and second processor cores and based, at least in part, on a temperature of the first and second processor cores, the one of the first and second processor cores in closer proximity to the cooling solution to be cooled more effectively, and wherein the thread scheduler logic is to assign the first thread further based on a cooling index for each of the first and second processor cores, wherein the cooling index is to be calculated according to a weighted sum of a thermal value and one or more non-thermal parameters for each of the first and second processor cores including a core priority value and a core performance value.

11. The processor of claim 10, wherein the thread scheduler logic to:
    determine a power density of each of the first and second processor cores if the first thread is executed on each of the respective first and second processor core; and
    assign the first thread to the first processor core, at least in part, if a power density of the first processor core was determined to be less than a power density of the second processor core.

12. The processor of claim 10, wherein the cooling solution comprises one or more fans, wherein the amount of power consumed by the one or more fans to sustain a required airflow comprises an amount of power fed to the one or more fans.

13. The processor of claim 12, wherein the required airflow comprises an amount of airflow to keep a given processor core's temperature below a temperature threshold.

14. The processor of claim 10, wherein the first processor core and the second processor core are heterogeneous processors.

15. The processor of claim 10, wherein the thread scheduler logic is to assign at least the first thread for execution on the first processor core, to prevent thermal throttling of one or more other threads executed on the second processor core and to enable the second processor core to execute one or more other threads at a higher performance level.

16. A non-transient computer readable medium to store instructions, which upon execution by a computer, cause the computer to perform a method, comprising:
    comparing an effectiveness of a cooling solution associated with a first processor to an effectiveness of the cooling solution associated with a second processor, the effectiveness based, at least in part, on a temperature of the first and second processors, the one of the first and second processor in closer proximity to the cooling solution to be cooled more effectively; and
    assigning at least a first thread for execution on the first processor, based, at least in part, on the comparing and further based on a cooling index for each of the first and second processors, wherein the cooling index is to be calculated according to a weighted sum of a thermal value and one or more non-thermal parameters for each of the first and second processors including a processor priority value and a processor performance value.

17. The non-transient computer readable medium of claim 16, wherein the performed method further comprises:
    determining a power density of each of the first and second processors if the first thread is executed on each of the respective first and second processors; and
    assigning the first thread to the first processor, at least in part, if a power density of the first processor was determined to be less than a power density of the second processor.

18. The non-transient computer readable medium of claim 17, wherein determining the power density is based, at least in part, on a thermal resistance of at least one core within each of the first and second processors.

19. The non-transient computer readable medium of claim 18, wherein the thermal resistance comprises an amount of power consumption to lower the at least one core temperature by a given amount.

20. The non-transient computer readable medium of claim 17, wherein determining the power density is based, at least in part, on one or more power characteristics of the first thread.

21. A processor comprising:
    a plurality of cores including a first core and a second core each including a temperature meter;
    a scheduling logic coupled to the plurality of cores, wherein the scheduling logic is to schedule a thread to one of the first and second cores based at least in part on a cooling index for each of the plurality of cores, wherein the cooling index is to be calculated according to a weighted sum of a thermal value and one or more non-thermal parameters for each of the plurality of cores, the one or more non-thermal parameters including a core priority value and a core performance value, the scheduling logic further to schedule the thread based on an effectiveness of a cooling solution coupled to the plurality of cores, the effectiveness based, at least in part, on a temperature of the first and second cores, the one of the first and second cores in closer proximity to the cooling solution to be cooled more effectively.

22. The processor of claim 21, wherein the one or more non-thermal parameters include a core utilization value and a core power consumption value.

* * * * *